US012670102B2

(12) United States Patent
Creed et al.

(10) Patent No.: US 12,670,102 B2
(45) Date of Patent: Jun. 30, 2026

(54) DYNAMIC CACHE SLOT PRE-ALLOCATION

(71) Applicant: Dell Products L.P., Round Rock, TX (US)

(72) Inventors: John Creed, Innishannon (IE); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/768,493

(22) Filed: Jul. 10, 2024

(65) Prior Publication Data

US 2026/0017201 A1    Jan. 15, 2026

(51) Int. Cl.
*G06F 12/08*        (2016.01)
*G06F 12/0871*      (2016.01)

(52) U.S. Cl.
CPC .. *G06F 12/0871* (2013.01); *G06F 2212/6042* (2013.01)

(58) Field of Classification Search
CPC ................. G06F 12/08; G06F 12/0871; G06F 2212/6042; G06F 12/0802; G06F 2212/282; G06F 2212/283
See application file for complete search history.

(56) References Cited

U.S. PATENT DOCUMENTS

| | | | | |
|---|---|---|---|---|
| 10,019,362 B1 * | 7/2018 | Chatterjee | ........... | G06F 12/0893 |
| 11,625,327 B2 * | 4/2023 | Krasner | .............. | G06F 12/0862 |
| | | | | 711/119 |
| 11,755,216 B2 * | 9/2023 | Scharland | ........... | G06F 12/0842 |
| | | | | 711/118 |
| 12,026,098 B1 * | 7/2024 | Thottappilly | ....... | G06F 12/0806 |

| | | | | |
|---|---|---|---|---|
| 2011/0246742 A1 * | 10/2011 | Kogen | .................. | G06F 9/5016 |
| | | | | 711/170 |
| 2011/0320731 A1 * | 12/2011 | Ambroladze | ....... | G06F 12/0895 |
| | | | | 711/E12.001 |
| 2012/0210068 A1 * | 8/2012 | Joshi | ................... | G06F 9/45558 |
| | | | | 711/E12.017 |
| 2021/0096997 A1 * | 4/2021 | Krasner | ............... | G06F 3/0656 |
| 2022/0138117 A1 * | 5/2022 | Kachmar | ............... | G06F 13/16 |
| | | | | 710/5 |
| 2022/0222176 A1 * | 7/2022 | Drewek-Ossowicka | .................... | |
| | | | | G06F 9/5005 |
| 2022/0300420 A1 * | 9/2022 | Ivester | ............... | G06F 11/2053 |
| 2024/0273666 A1 * | 8/2024 | Fishwick | ................. | G06T 1/20 |
| 2025/0147891 A1 * | 5/2025 | Alshawabkeh | ..... | G06F 12/0802 |

OTHER PUBLICATIONS

B. Yu and J. Pan, "Optimize the dynamic provisioning and request dispatching in distributed memory cache services," 2014 IEEE 22nd International Symposium of Quality of Service (IWQoS), Hong Kong, China, 2014, pp. 81-86.*

* cited by examiner

*Primary Examiner* — Pierre Michel Bataille
(74) *Attorney, Agent, or Firm* — Krishnendu Gupta; Nikhil Patel

(57)        ABSTRACT

One or more aspects of the present disclosure relate to dynamically pre-allocating cache slots based on workload forecasting. In embodiments, characteristics corresponding to one or more input/output (IO) operations received by a storage array are determined. An IO workload for one or more cache segments of system memory of the storage array is also forecasted. In addition, a queue depth for each cache pool of the one or more cache segments is dynamically adjusted. Further, cache slots are dynamically pre-allocated to each cache pool based on the queue depth of each cache pool.

20 Claims, 5 Drawing Sheets

200

206

208

204

202

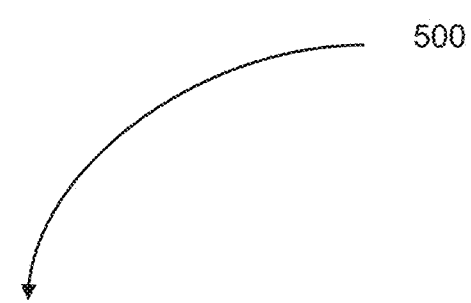

500 determining characteristics corresponding to one or more input/output (IO) operations received by a storage array

502 forecasting an IO workload for one or more cache segments of system memory of the storage array

504 dynamically adjusting a queue depth for each cache pool of the one or more cache segments

506 dynamically pre-allocating cache slots to each cache pool based on the queue depth of each cache pool

DYNAMIC CACHE SLOT PRE-ALLOCATION

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to dynamically pre-allocating cache slots based on workload forecasting. In embodiments, characteristics corresponding to one or more input/output (IO) operations received by a storage array are determined. An IO workload for one or more cache segments of system memory of the storage array is also forecasted. In addition, a queue depth for each cache pool of the one or more cache segments is dynamically adjusted. Further, cache slots are dynamically pre-allocated to each cache pool based on the queue depth of each cache pool.

In embodiments, the characteristics corresponding to the one or more IO operations received by the storage array can be determined. For example, the characteristics can include IO types, IO sizes, read hits, read misses, write hits, and write misses.

In embodiments, an unmirrored cache segment corresponding to IO read requests of the one or more IO operations can be established. Additionally, a mirrored cache segment corresponding to IO write requests of the one or more IO operations can be established.

In embodiments, one or more cache slot pools can be established with distinct cache slot sizes for the unmirrored cache segment and the mirrored cache segment.

In embodiments, a time-series analysis of each IO operation targeting each of the one or more cache segments can be performed to forecast the IO workload for the one or more cache segments of the system memory.

In embodiments, a weighted distribution of IO request sizes targeting each cache pool of the one or more cache segments can be determined.

In embodiments, a queue depth size for each IO queue corresponding to each cache pool can be dynamically established based on the weighted distribution of the IO request sizes targeting each cache pool of the one or more cache segments.

In embodiments, at least one dedicated cache worker thread can be assigned to each cache pool of the one or more cache segments. Further, the at least one dedicated cache worker thread can be responsible for pre-allocating cache slots for its respective cache pool.

In embodiments, the at least one dedicated cache worker thread of a subject cache pool can be dynamically reassigned to another cache pool based on a completion status of the least one dedicated cache worker thread of the subject cache pool and the weighted distribution of the IO request sizes targeting the other cache pool.

In embodiments, a minimum percentage of pre-allocated cache slots for each cache segment relative to a total number of cache slots in each cache segment can be maintained.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

FIG. 5 is a flow diagram of a method for dynamically pre-allocating cache slots based on workload forecasting per embodiments of the present disclosure.

DETAILED DESCRIPTION

Figure 1:
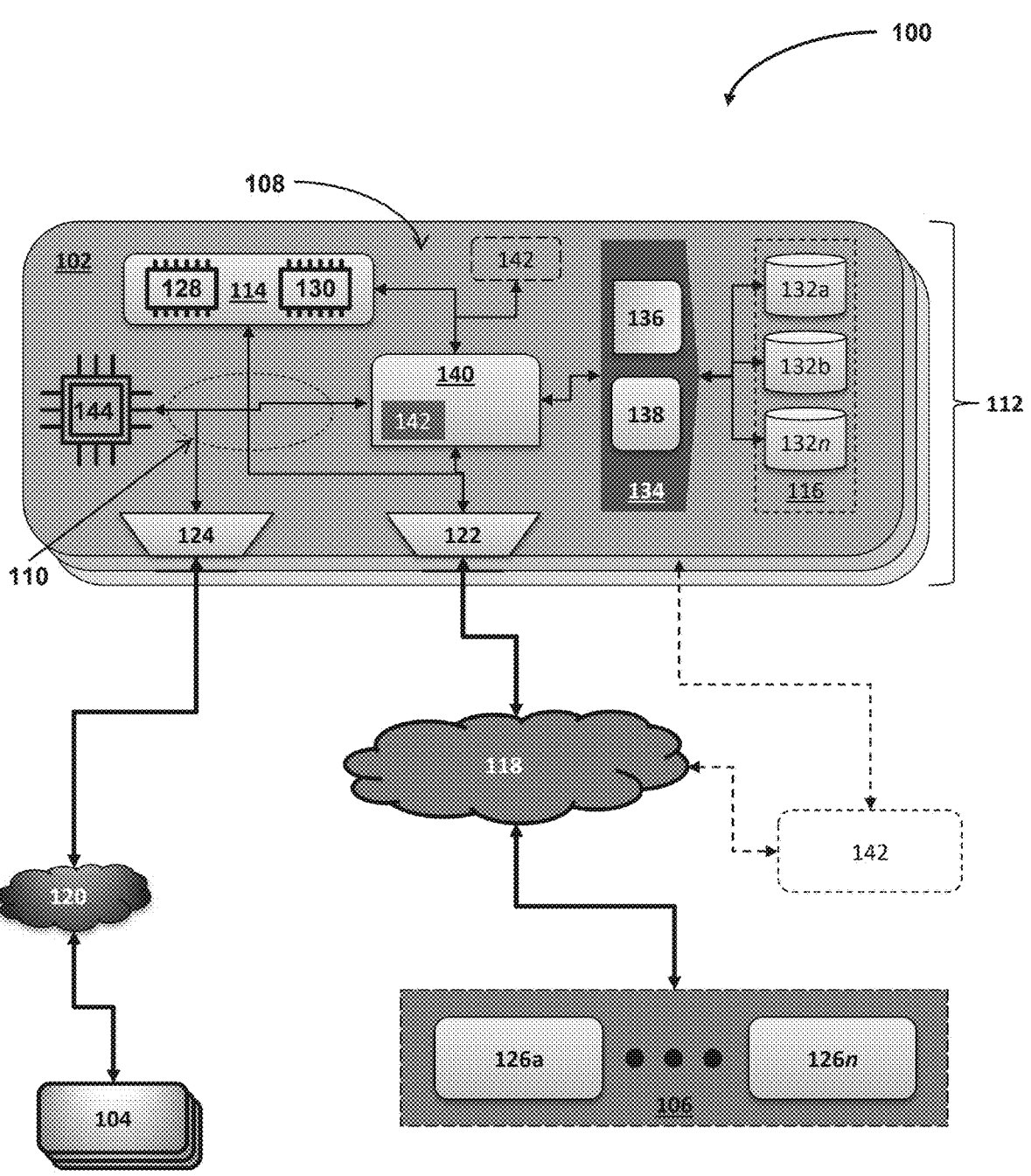
FIG. 1 illustrates a distributed network environment in accordance with embodiments of the present disclosure.

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In some circumstances, a financial institution, like a bank, can use a storage array to handle countless daily transactions, from deposits and withdrawals to complex financial analyses. The storage array can receive the daily transactions through input/output (IO) operations that include read/write data requests. Accordingly, the HDDs and SSDs of a storage array are like a massive digital filing cabinet that stores all the bank's data and helps retrieve it quickly when needed.

In addition, a storage array can use cache memory to enhance the performance of processing IO operations by reducing the time it takes to access data from the slower primary storage (e.g., the HDDs and SSDs). Cache memory, often called "cache," is a type of volatile computer memory that provides high-speed data storage and access to applications and processes, reducing the time to access data from the slower primary storage.

For example, whenever someone at the bank needs data, whether a customer is checking their account balance or a manager is analyzing financial reports, the storage array first looks in the cache. Thus, the cache is like a small basket that holds copies of the data that people at the bank use most often. If the needed data is in the basket (cache), the storage array quickly grabs and delivers it immediately. This is much faster than digging through the larger digital filing cabinet (e.g., the HDDs or SSDs). If the data isn't in the basket, the storage array must search the larger digital filing cabinet. Once it finds the data, it delivers it and puts a copy in the basket for next time, making future access faster. Thus, managing cache memory is crucial in enhancing storage array performance and efficiency.

A common challenge in cache management involves allocating and reallocating cache slots, which are specific memory spaces within the cache designated to store data temporarily. These slots are typically managed through various algorithms that determine how and when to allocate these slots to incoming data requests, directly impacting the system's response time and overall throughput.

In traditional cache management systems, cache slots are allocated to data requests based on static parameters that do not necessarily reflect the current workload or data access patterns. This static approach can lead to inefficiencies, such as increased latency and underutilization of cache resources, especially under varying workloads.

Furthermore, managing these cache slots involves operations across different cache segments, each potentially configured with different characteristics and storage capacities depending on the nature of the data being accessed (e.g., read-intensive vs. write-intensive data). The complexity of effectively managing these segments increases with the scale and variability of the data access patterns encountered in modern computing environments.

Embodiments of the present disclosure dynamically manage cache slots based on predictive analytics. For example, the embodiments include leveraging time series forecasting to anticipate future IO (Input/Output) operations, allowing the system to adjust the allocation of cache slots in real time to align with anticipated workloads.

Additionally, the embodiments dynamically adjust the queue depth for each cache pool within the storage array's cache segments. By analyzing historical and current IO operation data, the embodiments forecast the workload for various cache segments and adjust the number of cache slots pre-allocated in each segment accordingly. This proactive approach optimizes cache resource utilization and significantly reduces data access latency, enhancing a storage array's overall performance and efficiency. Thus, the techniques used by the embodiments disclosed herein are particularly beneficial in environments with variable and unpredictable data access patterns, such as financial institutions managing real-time transaction processing, where optimal cache management directly impacts operational efficiency and service quality.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. The memory 114 can also include local memory (LM 130), which stores instructions that the storage array's processors (CPUs) 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
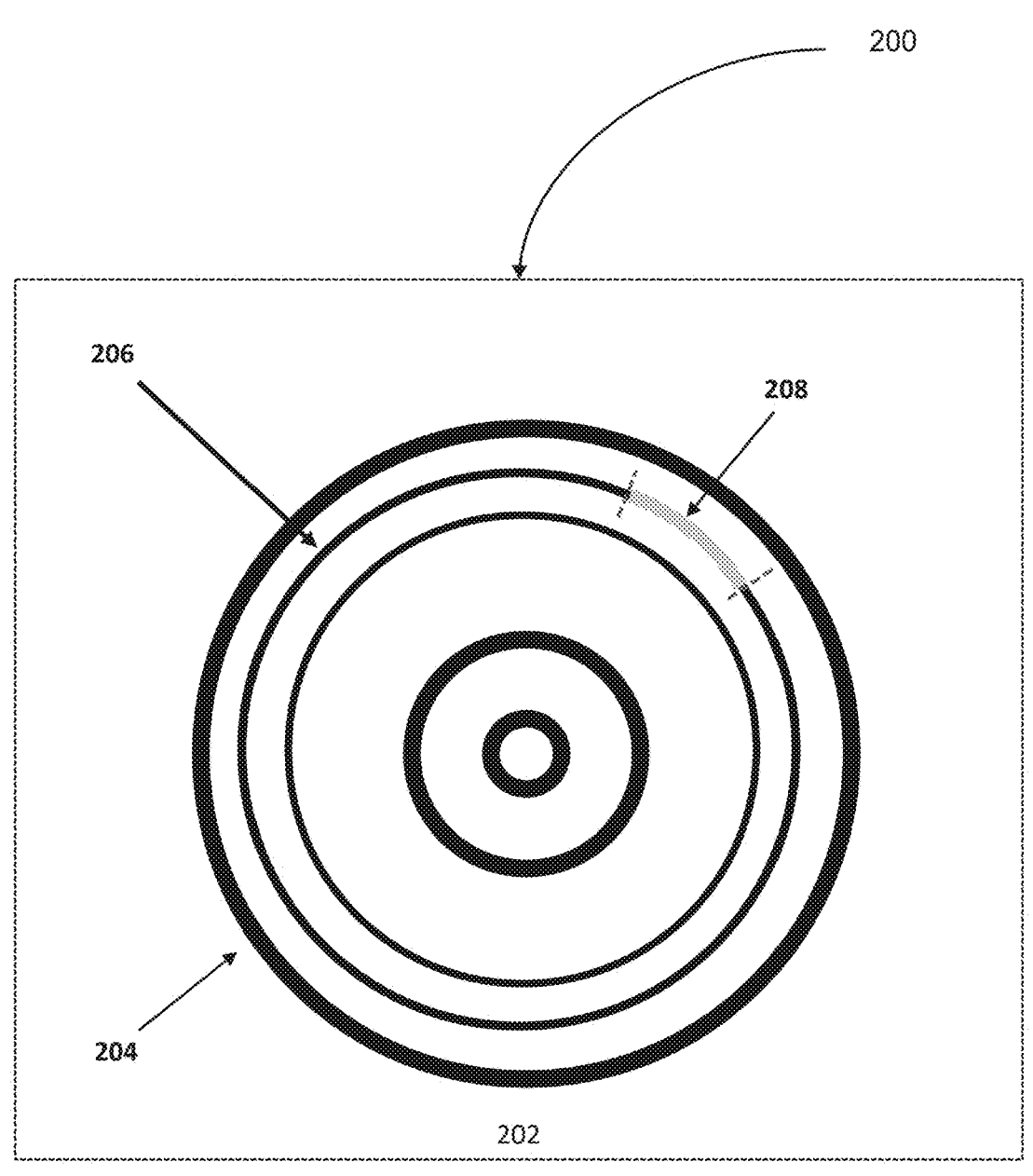
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-n. For example, the EDS 140 can provide a host, e.g., client machine 126a, with a virtual storage device (e.g., thin-device (TDEV)) that logically represents zero or more portions of each storage device 132a-n. For example, the EDS 140 can establish a logical track using zero or more physical address spaces from each storage device 132a-n. Specifically, the EDS 140 can establish a continuous set of logical block addresses (LBA) using physical address spaces from the storage devices 132a-n. Thus, each (LBA) represents a corresponding physical address space from one of the storage devices 132a-n. For example, a track can include 256 LBAs, amounting to 128 kb of physical storage space. Further, the EDS 140 can establish the TDEV using several tracks based on a desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
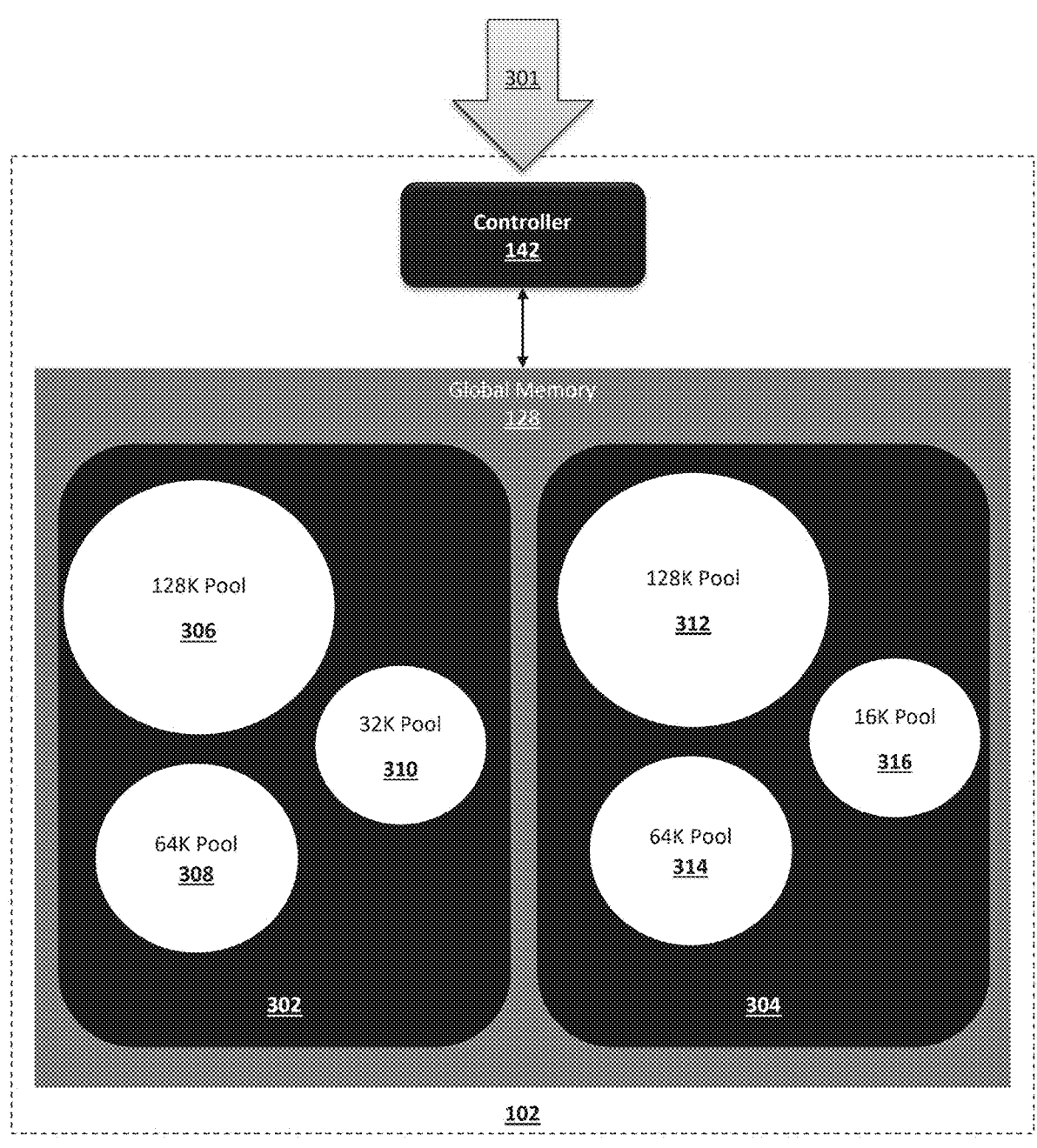
FIG. 3 is a block diagram of cache segments of system memory in accordance with embodiments of the present disclosure.

Regarding FIG. 3, a controller 142 (including logic, hardware, and circuitry) of a storage array 102 can analyze incoming IO operations in an IO workload 301 to determine their characteristics (e.g., read or write requests). Accordingly, the controller 142 can identify the predominant type of IO operations the storage array 102 receives from the IO workload 301.

In embodiments, the controller 142 can segment the storage array's global memory 128 into an unmirrored cache segment 302 and a mirrored cache segment 304. Mirrored segments are typically used for write operations to ensure data redundancy and integrity, providing a higher level of data protection by maintaining copies of the data. Unmirrored segments are generally allocated for read operations where redundancy is not required. In addition, the controller 142 can dynamically adjust the segments based on real-time and forecasted IO workload data. This dynamic adjustment allows the storage array 102 to adapt to changing I/O patterns and workload demands, optimizing performance and resource utilization.

In embodiments, the controller 142 can establish multiple cache pools within the unmirrored cache segment 302 and the mirrored cache segment 304. The controller 142 can define each pool to hold cache slots of a specific size tailored to typical request sizes observed in an IO workload analysis. For example, the unmirrored cache segment 302 can include a 128K pool 306, 64K pool 308, and a 32K pool 310. Additionally, the mirrored cache segment 304 can include a 128K pool 312, 64K pool 314, and a 16K pool 316.

In embodiments, the controller 142 can allocate cache slots within each pool 306, 308, 310, 312, 314, and 316 based on the anticipated needs of an IO workload (e.g., the IO workload 301). For example, the controller 142 can consider the frequency and size of past I/O requests to optimize the match between cache slot sizes and request sizes. Like cache segmentation, the controller 142 can dynamically adjust the size and number of cache slots. For example, the controller 142 can identify workload patterns and determine the effectiveness of current cache allocations in meeting performance targets to adjust the cache slot allocations dynamically.

Figure 4:
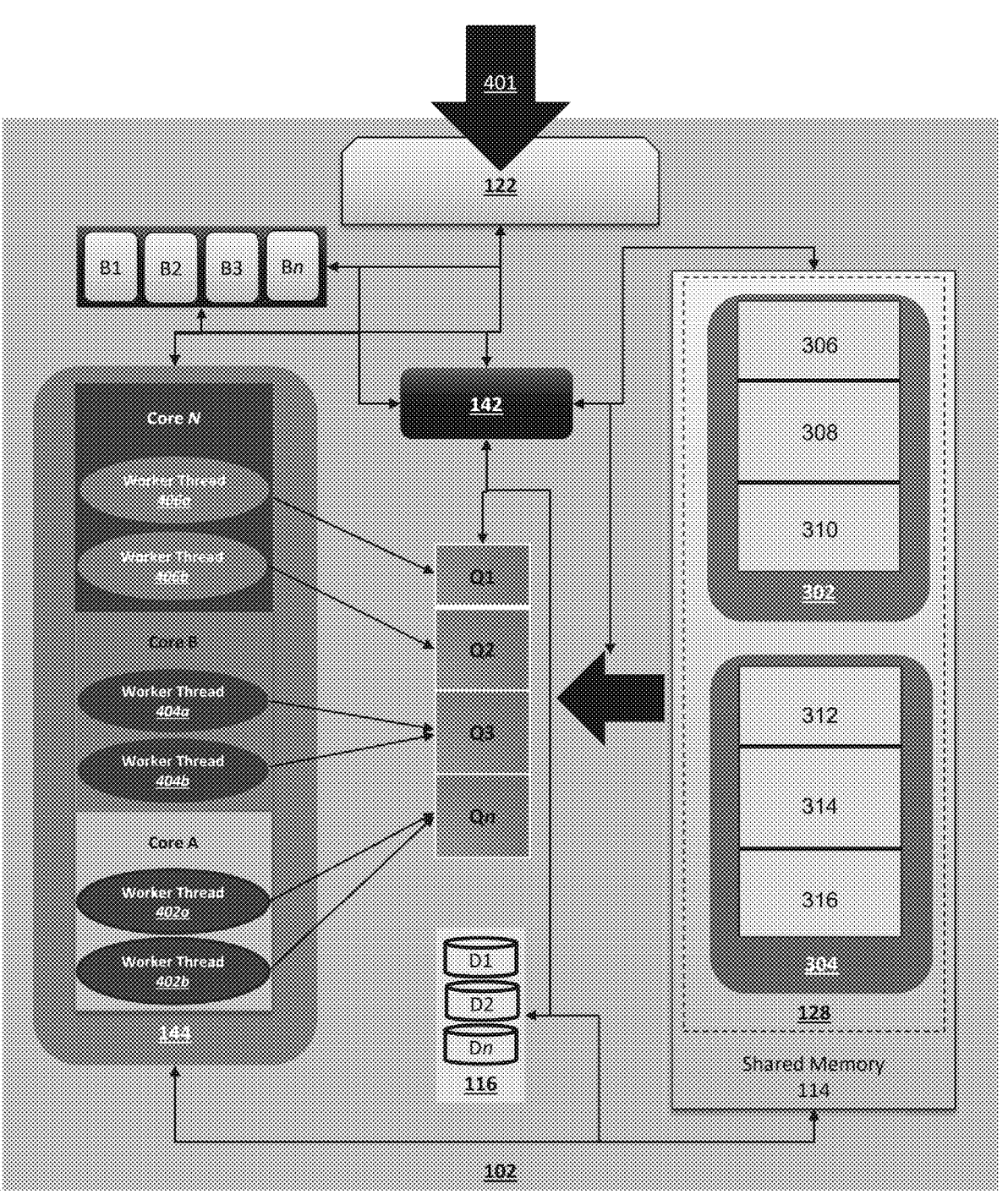
FIG. 4 is a block diagram of a controller and cache worker threads used to pre-allocate cache slots for one or more cache pools of each cache segment in accordance with embodiments of the present disclosure.

Regarding FIG. 4, a storage array 102 can include a host adapter (HA) 122 that receives IO operations in an IO workload 401 from one or more hosts (e.g., the hosts 106 of FIG. 1). Further, the HA 122 can characterize each IO operation based on its attributes such as type (read or write), size (e.g., 16K, 32K, 64K), and other relevant metadata. This characterization helps determine how the operation should be processed within the storage array 102.

For example, read requests can include read hits and read misses. Read hits occur when the data requested by one or more IO operations from a host system is found in cache memory (e.g., unmirrored cache memory 302), leading to a fast response as the data does not need to be retrieved from the slower backend storage (e.g., storage drives D1-*n* of persistent storage 116). Read misses happen when the requested data is unavailable in the cache, necessitating a fetch from the backend storage, which is slower than cache memory.

Likewise, write requests can include write hits and write misses. Write hits occur when data is written to a location already cached. The storage array 102 can quickly acknowledge the write because it updates the cache, and the data is later written back to the backend storage (e.g., one or more of the storage drives D1-*n* of the persistent storage 116). Write misses happen when data is written to a location not currently in the cache. This typically requires more complex handling, as the system must allocate space in the cache for the new data.

In embodiments, a controller 142 (including logic, hardware, and circuitry) can receive the characterizations of the IO operations in the IO workload 401 from the HA 142. Using the characterizations, the controller 142 can buffer the IO operations in buffers B1-*n*. The controller 142 can use the buffers B1-*n* to organize and prioritize the IO operations in the IO workload 401 as they arrive, ensuring that they are handled efficiently and in an order that optimizes system performance. For example, the buffers B1-2 can correspond to read buffers, while the buffers B3-*n* can correspond to write buffers.

In embodiments, the controller 142 can store incoming IO operations with read requests in the read buffers B1-2. In addition, the controller 142 can process these read requests by first checking if the requested data is available in the unmirrored cache 302. If the data is in the cache (a read hit), it is quickly served to the host. If not (a read miss), the controller must retrieve the data from the backend storage (e.g., the persistent storage 116).

Further, the controller 142 can store incoming IO operations with write requests in the write buffers B3-*n*. The write buffers B3-*n* can prioritize IO operations based on their corresponding service levels (e.g., Diamond, Platinum, Gold, Silver, and Bronze). For example, the controller 142 can prioritize write requests in the write buffers B3-*n* so that high-priority (e.g., Diamond or Platinum) writes are processed first.

In embodiments, the controller 142 can collect data corresponding to IO operations stored in the buffers B1-*n*. The data can include IO characteristics such as IO types, sizes, frequency, and patterns of read and write requests (e.g., access patterns). Further, the controller 142 can continuously collect the characteristics, allowing it to adapt to workload changes dynamically.

Using the collected data, the controller 142 can perform a time-series analysis to forecast future IO workloads. The analysis can consider historical trends and patterns in I/O operations to predict the distribution of IO request sizes for upcoming periods. For example, the controller 142 can use ARIMA (Autoregressive Integrated Moving Average) models for forecasting IO workloads (e.g., the IO workload 401). ARIMA is a statistical technique that can predict future workloads based on historical data.

In embodiments, the controller 142 can allocate cache slots from global memory 128 to pre-cache data based on predicted IO workloads. Specifically, the controller 142 can reserve and proactively fill cache slots in the unmirrored segment 302 and the mirrored segment 304 of the global memory (GM) 128 with data stored in persistent storage predicted to be accessed soon. The prediction can be based on analyzing IO patterns and workload forecasting.

In addition, the controller 142 can pre-allocate cache slots from global memory 128 for one or more of the pools corresponding to the unmirrored segment 302 and the mirrored segment 304 of the GM 128. Pre-allocating cache slots involves reserving a certain number of cache slots in advance, based on anticipated needs, without filling them with data immediately. Accordingly, the controller 142 earmarks the pre-allocated cache slots for future use, ensuring that they are readily available when needed without the delay of allocation at the time of receiving an IO operation with a read/write request.

Thus, the controller 142 can reduce the latency associated with the dynamic allocation of cache slots during IO operations by pre-allocating cache slots for each of the pools 306, 308, 310, 312, 314, and 316 in the unmirrored segment 302 and the mirrored segment 304. By having slots readily available, the controller 142 can quickly respond to IO requests, particularly for write operations where data needs to be stored in the cache promptly.

In embodiments, the controller 142 can identify the different cache segments of the GM 128 based on the types of IO operations. For example, the controller 142 can distinguish between read and write IO operations and between an unmirrored segment 302 and a mirrored segment 304 for reads and writes, respectively. Further, the controller 142 can establish separate cache slot queues Q1-$n$ for each cache segment 302/304 and their corresponding cache slot pools 306, 308, 310, 312, 314, and 316. The controller 142 can use the cache slot queues Q1-$n$ to pre-allocate cache slots, e.g., hold and reserve slots in advance to handle anticipated IO operations, reducing allocation latency. For example, the cache slot queue Q1 can correspond to the 128K pool 306, and the cache slot queue Q2 can correspond to the 64$k$ pool 308 of the unmirrored segment 302. Additionally, the cache slot queue Q3 can correspond to the 128K pool 312, and the cache slot queue Qn can correspond to the 16K pool 316 of the mirrored segment 304.

In embodiments, the controller 142 can establish the starting depths of each cache slot queue Q1-$n$ based on an initial analysis of IO workloads and storage array specifications. For example, the starting depths can be based on factors like the total cache capacity, typical workload patterns, and performance objectives of the storage array 102.

In embodiments, the controller 142 can dynamically adjust the depths of the cache slot queues Q1-$n$ in response to real-time workload data. For example, if the forecast indicates an upcoming increase in demand for certain types of IO operations, the controller 142 may increase the depth of the pre-allocated or in-use cache slot queues for the relevant cache slot pools. Conversely, if the demand is lower than expected, the controller may reduce the depth of these queues Q1-$n$ to free up resources for other operations or to conserve energy.

For example, the controller 142 can calculate a weighted distribution of IO operation sizes and their respective types (e.g., read or write) based on the forecasted data. Thus, the controller 142 can determine the proportion of IO operation sizes and types within an expected IO workload (e.g., the IO workload 401). For example, if the forecast predicts a high frequency of 16K write requests, the weight for 16K slots in the 16K write cache pool 316 will be higher.

Using the weighted distribution, the controller 142 dynamically adjusts the queue depth for each cache slot queue Q1-$n$. If the weighted distribution indicates a higher percentage of certain IO sizes, the queue depth for those specific cache slot queues is increased to accommodate the expected demand. This ensures enough pre-allocated slots are available to handle the forecasted workload efficiently.

In embodiments, the controller 142 can allocate and relocate worker threads 402*a-b*, 404*a-b*, and 406*a-b* of processor cores A-N of the storage array's CPU resources 144 to manage cache slot queues. The controller 142 can dynamically assign processor resources to handle the pre-allocation of cache slots based on current and predicted workload demands. For example, the controller 142 can assign dedicated cache worker threads to each cache slot queue Q1-$n$. Additionally, the controller 142 can monitor the completion status of each worker thread's tasks and the ongoing needs of other cache slot queues Q1-$n$. If a cache slot queue Q1-$n$ has completed its pre-allocation and another cache slot queue Q1-$n$ is under higher demand due to its weighted distribution, the controller 142 can dynamically reassign one or more of the worker threads 402*a-b*, 404*a-b*, and 406*a-b* to assist with pre-allocation in the cache slot queue Q1-$n$. This flexibility helps balance the workload across the storage array 102 and optimize the use of computational resources.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 5, a method 500 relates to dynamically pre-allocating cache slots based on workload forecasting. In embodiments, the controller 142 of FIG. 1 can perform all or a subset of operations corresponding to the method 500.

For example, the method 500, at 502, can include determining characteristics corresponding to one or more input/output (IO) operations received by a storage array. Additionally, at 504, the method 500 can include forecasting an IO workload for one or more cache segments of system memory of the storage array. Further, the method 500, at 506, can include dynamically adjusting a queue depth for each cache pool of the one or more cache segments. At 508, the method 500 can also include dynamically pre-allocating cache slots to each cache pool based on the queue depth of each cache pool.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are openended, include the listed parts, and contain additional unlisted elements. Unless explicitly disclaimed, the term 'or' is open-ended and includes one or more of the listed parts, items, elements, and combinations thereof.

What is claimed is:

1. An apparatus with a memory and processor, the apparatus configured to:

determine characteristics corresponding to one or more input/output (IO) operations received by a storage array;

establish separate cache slot queues for each cache pool of one or more cache segments of system memory of the storage array;

forecast an IO workload for one or more cache segments of system memory of the storage array;

dynamically adjust a queue depth for each cache pool of the one or more cache segments; and dynamically reserve cache slots in advance for each cache pool based on the queue depth of each cache pool, wherein the cache slots are reserved before receiving IO operations that will use the cache slots, wherein reserving comprises earmarking the cache slots without filling them with data immediately such that the cache slots are readily available in the cache slot queues when needed without delay of allocation at a time of receiving the IO operations, thereby reducing allocation latency when the IO operations are subsequently received.

2. The apparatus of claim 1, further configured to:

determine the characteristics corresponding to the one or more IO operations received by the storage array, wherein the characteristics include IO types, IO sizes, read hits, read misses, write hits, and write misses.

3. The apparatus of claim 1, further configured to:

establish an unmirrored cache segment corresponding to IO read requests of the one or more IO operations; and establish a mirrored cache segment corresponding to IO write requests of the one or more IO operations.

4. The apparatus of claim 3, further configured to:

establish one or more cache slot pools with distinct cache slot sizes for the unmirrored cache segment and the mirrored cache segment.

5. The apparatus of claim 1, further configured to:

perform a time-series analysis of each IO operation targeting each of the one or more cache segments to forecast the IO workload for the one or more cache segments of the system memory.

6. The apparatus of claim 1, further configured to:

determine a weighted distribution of IO request sizes targeting each cache pool of the one or more cache segments.

7. The apparatus of claim 6, further configured to:

dynamically establish a queue depth size for each IO queue corresponding to each cache pool based on the weighted distribution of the IO request sizes targeting each cache pool of the one or more cache segments.

8. The apparatus of claim 7, further configured to:

assign at least one dedicated cache worker thread to each cache pool of the one or more cache segments, wherein the at least one dedicated cache worker thread is responsible for pre-allocating cache slots for its respective cache pool.

9. The apparatus of claim 8, further configured to:

dynamically reassign the at least one dedicated cache worker thread of a subject cache pool to another cache pool based on a completion status of the least one dedicated cache worker thread of the subject cache pool and the weighted distribution of the IO request sizes targeting the other cache pool.

10. The apparatus of claim 1, further configured to:

maintain a minimum percentage of pre-allocated cache slots for each cache segment relative to a total number of cache slots in each cache segment.

11. A method comprising:

determining characteristics corresponding to one or more input/output (IO) operations received by a storage array;

establishing separate cache slot queues for each cache pool of one or more cache segments of system memory of the storage array;

forecasting an IO workload for one or more cache segments of system memory of the storage array;

dynamically adjusting a queue depth for each cache pool of the one or more cache segments; and dynamically reserving cache slots in advance for each cache pool based on the queue depth of each cache pool, wherein the cache slots are reserved before receiving IO operations that will use the cache slots, wherein reserving comprises earmarking the cache slots without filling them with data immediately such that the cache slots are readily available in the cache slot queues when needed without delay of allocation at a time of receiving the IO operations, thereby reducing allocation latency when the IO operations are subsequently received.

12. The method of claim 11, further comprising:

determining the characteristics corresponding to the one or more IO operations received by the storage array, wherein the characteristics include IO types, IO sizes, read hits, read misses, write hits, and write misses.

13. The method of claim 11, further comprising:

establishing an unmirrored cache segment corresponding to IO read requests of the one or more IO operations; and establishing a mirrored cache segment corresponding to IO write requests of the one or more IO operations.

14. The method of claim 13, further comprising:

establishing one or more cache slot pools with distinct cache slot sizes for the unmirrored cache segment and the mirrored cache segment.

15. The method of claim 11, further comprising:

performing a time-series analysis of each IO operation targeting each of the one or more cache segments to forecast the IO workload for the one or more cache segments of the system memory.

16. The method of claim 11, further comprising:

determining a weighted distribution of IO request sizes targeting each cache pool of the one or more cache segments.

17. The method of claim 16, further comprising:

dynamically establishing a queue depth size for each IO queue corresponding to each cache pool based on the weighted distribution of the IO request sizes targeting each cache pool of the one or more cache segments.

18. The method of claim 17, further comprising:

assigning at least one dedicated cache worker thread to each cache pool of the one or more cache segments, wherein the at least one dedicated cache worker thread is responsible for pre-allocating cache slots for its respective cache pool.

19. The method of claim 18, further comprising:

dynamically reassigning the at least one dedicated cache worker thread of a subject cache pool to another cache pool based on a completion status of the least one dedicated cache worker thread of the subject cache pool and the weighted distribution of the IO request sizes targeting the other cache pool.

20. The method of claim 11, further comprising:

maintaining a minimum percentage of pre-allocated cache slots for each cache segment relative to a total number of cache slots in each cache segment.

* * * * *